No. 719,696. PATENTED FEB. 3, 1903.
N. SANDERS.
WHEEL PLOW.
APPLICATION FILED JULY 23, 1902.
NO MODEL. 2 SHEETS—SHEET 1.
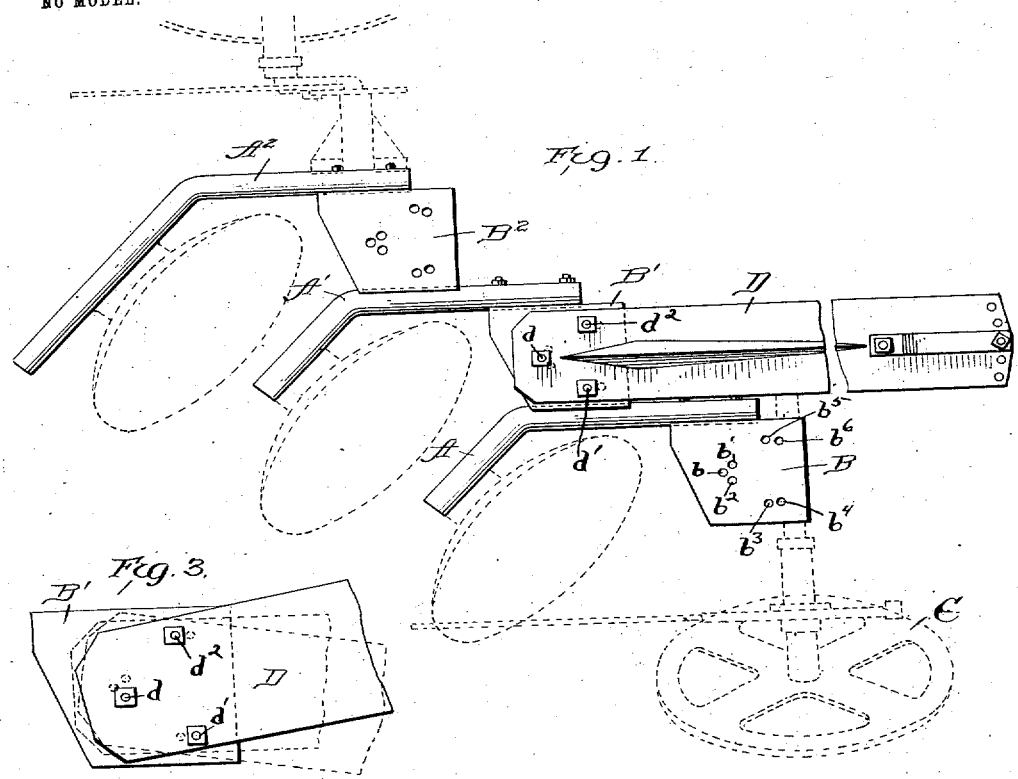
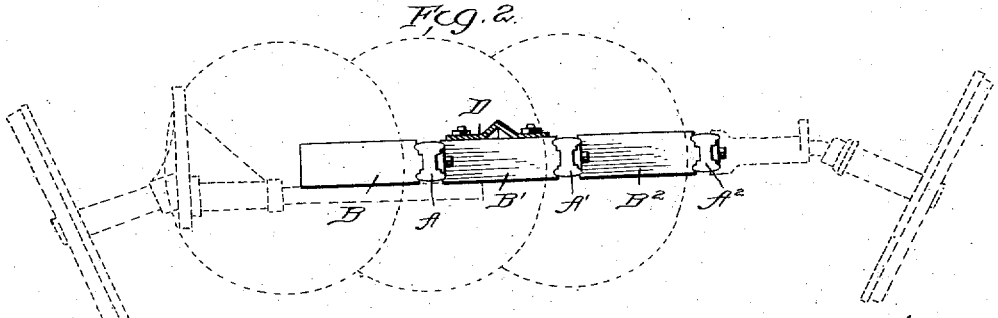
Attest:
C. J. Middleton
James M. Shea
Inventor.
Newell Sanders.
by Ellis Spear
Atty.

UNITED STATES PATENT OFFICE.

NEWELL SANDERS, OF CHATTANOOGA, TENNESSEE.

WHEEL-PLOW.

SPECIFICATION forming part of Letters Patent No. 719,696, dated February 3, 1903.

Application filed July 23, 1902. Serial No. 116,724. (No model.)

*To all whom it may concern:*

Be it known that I, NEWELL SANDERS, a citizen of the United States, residing at Chattanooga, Tennessee, have invented certain new and useful Improvements in Wheel-Plows, of which the following is a specification.

My invention relates to wheel-plows, and more particularly to multiple plows of the disk type.

The object of the invention is to provide a simple and effective manner of changing the line of draft to suit the number of horses hitched abreast and to make the plow run true without inclination toward or away from the land; also, in a convertible plow to provide a simple and effective manner for changing the line of draft to suit a single, double, triple, or larger plow.

This invention is illustrated in the accompanying drawings, in which—

Figure 4:
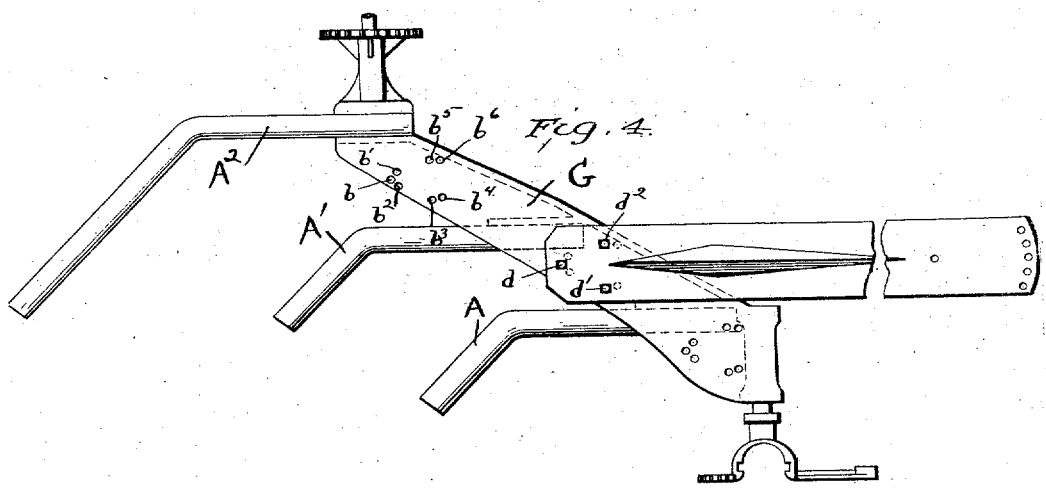
Figure 5:
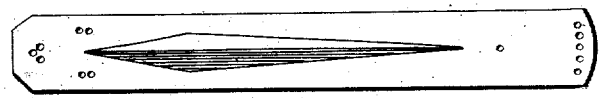

Figure 1 is a plan view. Fig. 2 is a front sectional elevation, and Fig. 3 is a detail plan view. Fig. 4 is a plan view of a modification. Fig. 5 is a modified form of tongue.

In the drawings I have shown only those parts which are necessary for a proper understanding of the invention and have omitted some parts and details which, it will be understood, may be of any desired construction.

Referring by reference-letter to the parts shown, A, A', and $A^2$ represent, respectively, first, second, and third beams, which are connected by spacing or coupling blocks B' and $B^2$ and which beams carry the usual furrow-turning devices, such as rotary disks, which are indicated by dotted lines. A block or member B, similar to blocks B' and $B^2$, is secured to the first beam A, and by this the furrow-wheel C is carried in any suitable manner either directly or indirectly. The tongue is shown at D, and in order that this may be secured to the plow at different points to change the line of draft according to varying conditions each of the blocks B, B', and $B^2$ is provided with holes $b$, preferably three in number, though any number may be used, and bolts $d$, passing through these holes and corresponding holes in the tongue, secure said tongue removably in place.

It is often desirable to deflect the tongue to one side or the other, and I provide for this by making extra holes either in the blocks or in the tongue, or in both, by which means the tongue may be placed straight or deflected to one side or the other, as clearly indicated in Fig. 3.

It will be observed that I preferably provide seven holes in one of the members, which may be either in the coupling-block, as shown in Fig. 4, or in the tongue, as shown in Fig. 5. The seven holes form three sets, coöperating with the three holes in the other member to produce three different adjustments of the tongue. For instance, the holes $b$, $b^3$, and $b^5$ will form one set of holes, $b'$, $b^3$, and $b^6$ another set, and the holes $b^2$, $b^4$, and $b^5$ the third set or group. The holes $b^5$ and $b^6$ are equidistant from or on a line concentric with the hole $b^3$, and likewise the holes $b^3$ and $b^4$ are on a line concentric with the hole $b^5$. When the tongue is extended straight ahead, the rear securing-bolt will be passed through the central opening $b$ and bolts $d'$ and $d^2$ through the holes $b^3$ and $b^5$, respectively. Should, however, it be desired to deflect the tongue to the left, as shown in full lines in Fig. 3, the bolts $d$ and $d'$ are removed and the tongue swung on the bolt $d^2$ as a pivot, and as the holes $b$, $b^2$, $b^3$, and $b^4$ are arranged on a line or lines concentric with the hole $b^5$ it will be seen that the holes in one member—say the tongue—are brought into line with the exra set in the other member, as shown at $d$ and $d'$ in Fig. 3, and the tongue may thus be securely clamped in this adjusted position. If, on the contrary, the tongue is to be deflected to the right, the bolts $d$ and $d^2$ are removed and the tongue swung on the bolt $d'$ as a pivot, and as the holes $b$, $b'$, $b^5$, and $b^6$ are arranged on a line or lines concentric with the hole $b^3$ a similar alinement of the extra holes will take place, as previously described, and the tongue may be securely clamped in the position of inclination indicated in dotted lines in Fig. 3.

Instead of a frame made up of beams joined by coupling-blocks I may use a single rigid bar member G, arranged diagonally to the beams A, A', and $A^2$ and to which said beams are rigidly though detachably bolted.

In Fig. 5 I have shown the tongue as provided with the plurality of sets of holes.

It will be understood that while I have shown a three-disk plow I do not limit myself as to the number; but the plow may have any number of furrow-opening devices and the corresponding number of adjustments made for the tongue.

Having thus described my invention, what I claim is—

1. In a gang or multiple plow, a tongue and means for connecting it thereto at points varying in distance from the front of the plow and also varying in distance from the side of the plow, substantially as described.

2. In a gang or multiple plow, a frame having a plurality of detachably-connected furrow-opening devices, a series of sets of holes in said frame arranged diagonally of the plow, a tongue having corresponding holes, and bolts for connecting said tongue to any one set of the series, substantially as described.

3. In a gang or multiple plow, a frame comprising a plurality of beams and connected spacing-blocks, a tongue, and means whereby said tongue may be detachably and adjustably connected to any one of said blocks, substantially as described.

4. In a plow, a frame and a tongue, one of said parts having a set of holes and the other a corresponding set, bolts passing through said holes for securing the parts together, said other part having extra holes arranged on lines concentric with one of the holes of the main set whereby the bolts may be removed and the tongue sprung to bring the extra holes of the one part into alinement with corresponding holes of the other part, substantially as described.

5. In a plow, a frame, a tongue, one of said parts having a set of holes, and the other a plurality of sets, said plurality comprising the intermediate holes $b$ $b^3$ and $b^5$, a pair of holes $b'$ and $b^6$ arranged on a circle concentric with the hole $b^3$, and a second pair of holes $b^2$ and $b^4$ on a circle concentric with the hole $b^3$ and bolts for passing through the holes and connecting said parts together, substantially as described.

In testimony whereof I affix my signature in presence of two witnesses.

NEWELL SANDERS.

Witnesses:
 THOS. B. STAPP,
 A. W. LANTER, Jr.

---

Correction in Letters Patent No. 719,696.

It is hereby certified that in Letters Patent No. 719,696, granted February 3, 1903, upon the application of Newell Sanders, of Chattanooga, Tennessee, for an improvement in "Wheel-Plows," an error appears in the printed specification requiring correction, as follows: In line 33, page 2, the word "sprung" should read *swung;* and that the said Letters Patent should be read with this correction therein that the same may conform to the record of the case in the Patent Office.

Signed and sealed this 21st day of July, A. D., 1903.

[SEAL.]

E. B. MOORE,
*Acting Commissioner of Patents.* self as to the number; but the plow may have any number of furrow-opening devices and the corresponding number of adjustments made for the tongue.

Having thus described my invention, what I claim is—

1. In a gang or multiple plow, a tongue and means for connecting it thereto at points varying in distance from the front of the plow and also varying in distance from the side of the plow, substantially as described.

2. In a gang or multiple plow, a frame having a plurality of detachably-connected furrow-opening devices, a series of sets of holes in said frame arranged diagonally of the plow, a tongue having corresponding holes, and bolts for connecting said tongue to any one set of the series, substantially as described.

3. In a gang or multiple plow, a frame comprising a plurality of beams and connected spacing-blocks, a tongue, and means whereby said tongue may be detachably and adjustably connected to any one of said blocks, substantially as described.

4. In a plow, a frame and a tongue, one of said parts having a set of holes and the other a corresponding set, bolts passing through said holes for securing the parts together, said other part having extra holes arranged on lines concentric with one of the holes of the main set whereby the bolts may be removed and the tongue sprung to bring the extra holes of the one part into alinement with corresponding holes of the other part, substantially as described.

5. In a plow, a frame, a tongue, one of said parts having a set of holes, and the other a plurality of sets, said plurality comprising the intermediate holes $b$ $b^3$ and $b^5$, a pair of holes $b'$ and $b^6$ arranged on a circle concentric with the hole $b^3$, and a second pair of holes $b^2$ and $b^4$ on a circle concentric with the hole $b^3$ and bolts for passing through the holes and connecting said parts together, substantially as described.

In testimony whereof I affix my signature in presence of two witnesses.

NEWELL SANDERS.

Witnesses:
THOS. B. STAPP,
A. W. LANTER, Jr.

---

It is hereby certified that in Letters Patent No. 719,696, granted February 3, 1903, upon the application of Newell Sanders, of Chattanooga, Tennessee, for an improvement in "Wheel-Plows," an error appears in the printed specification requiring correction, as follows: In line 33, page 2, the word "sprung" should read *swung;* and that the said Letters Patent should be read with this correction therein that the same may conform to the record of the case in the Patent Office.

Signed and sealed this 21st day of July, A. D., 1903.

[SEAL.]

E. B. MOORE,
*Acting Commissioner of Patents.*

Correction in Letters Patent No. 719,696.

It is hereby certified that in Letters Patent No. 719,696, granted February 3, 1903, upon the application of Newell Sanders, of Chattanooga, Tennessee, for an improvement in "Wheel-Plows," an error appears in the printed specification requiring correction, as follows: In line 33, page 2, the word "sprung" should read *swung;* and that the said Letters Patent should be read with this correction therein that the same may conform to the record of the case in the Patent Office.

Signed and sealed this 21st day of July, A. D., 1903.

[SEAL.]

E. B. MOORE,
*Acting Commissioner of Patents.*